Figure 1:
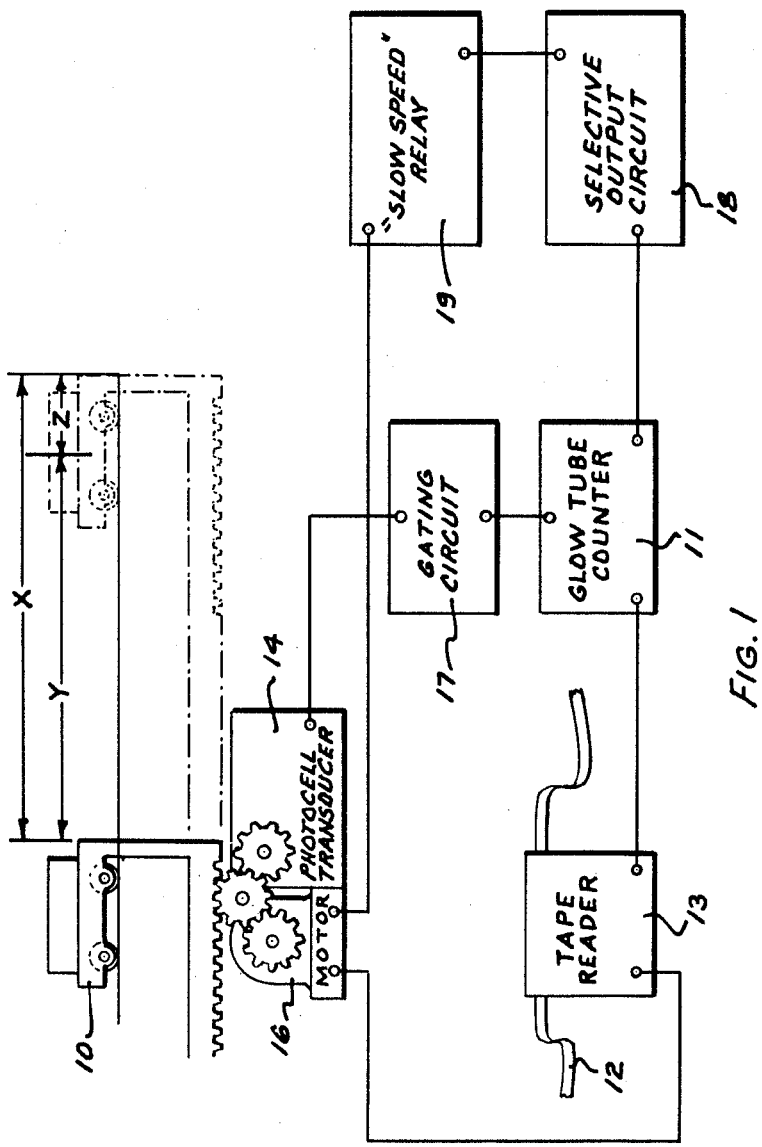

Dec. 29, 1964 G. C. VEVERKA 3,163,747
CIRCUIT FOR ANALYZING SELECTED PATTERNS
OF MULTIPLE INTELLIGENCE SIGNALS
Filed May 15, 1962 2 Sheets-Sheet 1

INVENTOR
G. C. VEVERKA
BY A. C. Schwarz, Jr.
ATTORNEY

Dec. 29, 1964 G. C. VEVERKA 3,163,747
CIRCUIT FOR ANALYZING SELECTED PATTERNS
OF MULTIPLE INTELLIGENCE SIGNALS
Filed May 15, 1962 2 Sheets-Sheet 2

INVENTOR
G.C. VEVERKA
BY
a.c. Schwarz jr.
ATTORNEY

United States Patent Office

3,163,747
Patented Dec. 29, 1964

3,163,747
CIRCUIT FOR ANALYZING SELECTED PATTERNS OF MULTIPLE INTELLIGENCE SIGNALS
George C. Veverka, Berwyn, Ill., assignor to Western Electric Company, Incorporated, New York, N.Y., a corporation of New York
Filed May 15, 1962, Ser. No. 194,896
7 Claims. (Cl. 235—92)

The present invention relates generally to a circuit for indicating when selected pattern relationships are present in a variable multiple intelligence signal, and more particularly to the utilization of such a circuit, in combination with a multidecade counter circuit, for indicating when the output signal of the counter is below a preset multidigit number. Accordingly, the general objects of the invention are to provide new and improved circuits of such character.

Heretofore, selective output circuits have been used, in conjunction with various kinds of circuitry, to provide an output only when a single predetermined state is attained in a multiple intelligence signal from the corresponding circuit. The widespread advancement of the associated technology has made it necessary that new and improved selective output circuits be designed so that an output will be effected not only when a single preselected pattern relationship is present in the multiple intelligence signal from the associated circuitry, but also when all pattern relationships included within some prearranged association with the preselected pattern relationship are occasioned in the multiple intelligence signal.

Accordingly, more specific objects of the invention are to provide new and improved selective output circuits that will provide an indication not only when a single predetermined pattern relationship is present in the multiple intelligence signal from associated circuitry, but also when all pattern relationships included within some prearranged association with the preselected pattern relationship are occasioned in the multiple intelligence signal.

The specific application contemplated, wherein such a circuit is requisite, involves the utilization thereof in combination with a multidecade counter to indicate when the output signal of the counter is below a preset multidigit number. In order to perform this function, the circuit must embody an expedient method of analyzing nonoverlapping ranges of counts of the counter, which ranges combine to encompass the composite range of counts below the selected number which in turn is variable. This suggests the possibility of using AND circuits, but no presently known combination of AND circuits could efficiently analyze any one range of counts not only because of the multiplicity of numbers therein, but also because the range is variable. The possibility of combining AND circuits with some kind of switching mechanisms was considered, but again no presently known switching mechanisms could be effectively combined with available AND circuits to encompass the multiplicity of numbers even in a single range.

Therefore, a further object of the invention is to provide new and improved selective output circuits which embody an expeditious method of cascading AND circuits so as to analyze nonoverlapping ranges of counts of a counter, which ranges combine to encompass all counts below the selected number.

Another object of the invention is to provide new and improved selective output circuits utilizing AND circuits which are cascaded to analyze nonoverlapping ranges of counts of a counter, which ranges combine to encompass the composite range of counts below a selected number on the counter, in combination with switching mechanisms which permit the selected number as well as the nonoverlapping ranges to be varied so that an indication is provided when the output signal of the counter is below a preset multidigit number.

With the foregoing and other objects in mind and in accordance with certain aspects of the invention, a bank of multicontact switches is arranged such that each switch has one specific contact to which an intelligence signal is applied at any one time in accordance with a pattern relationship to be analyzed. Each switch is provided with a selector arm preset to make electrical connection with a reference contact and a shunting member which makes electrical connection with any contacts of that switch in a predetermined position relative to the reference contact. The selector arms and the shunting members of all the switches in the bank thereby establish selected pattern relationships for which a coincidence circuit connected to the shunting member of at least one switch in the bank and to the selector arm of at least one other switch provides an output.

In accordance with more specific aspects of the invention the switches of the bank are arranged such that each switch analyzes a particular portion of each pattern relationship of the multiple intelligence signal in accordance with a graduation of the relative degree of sensitivity of each portion and a graduation of the degree of sensitivity within each portion as established by the contacts of the corresponding switch. In addition, the shunting member of each switch makes electrical connection with all contacts at one side of the reference contact to establish with the selector arm the selected sensitivities of the portion of the selected pattern relationships corresponding to that switch. A coincidence circuit associated with each switch except the one analyzing the least sensitive portion of each pattern is connected to the shunting member thereof and to the selector arm of each switch corresponding to a less sensitive portion of the pattern so that an output signal is provided for all pattern relationships of the intelligence signal having one of the selected sensitivities in each portion thereof established by the reference contact and all contacts connected at one side thereof for the corresponding switch.

Other objects, advantages, and aspects of the invention will appear from the following detailed description of a specific embodiment thereof, when taken in conjunction with the appended drawings, in which:

FIG. 1 is a block diagram of a preferred embodiment of the invention, in combination with a specific application thereof with a counter for a machining apparatus indicated generally diagrammatically; and FIG. 2 is a schematic diagram depicting the manner in which AND circuits are cascaded in combination with selector switches to form a preferred embodiment of the invention to be utilized an analyzing the multiple intelligence output signal of a glow tube counter.

For purposes of clarity and understanding, a general description of the apparatus constituting a specific application in which a preferred embodiment of the invention can be utilized will be given at the outset. Generally, the apparatus contemplated includes any machine wherein a work carriage 10 is required to travel a predetermined distance X for a specific machining operation, as shown in FIG. 1. A number representing the distance X to be traveled by the work carriage 10 is initially preset on a glow tube counter 11 by means of a punched tape 12 fed through a generally conventional tape reader 13.

Movement of the carriage 10 upon the "start" command results in the generation of voltage pulses from a photocell transducer 14 geared to a driving motor 16 for advancing the carriage 10. These pulses are fed into the counter 11 through a conventional gating circuit 17 to effect a counting down operation of the counter from the preset number. At some distance Y near the end of carriage travel, it is desired that the carriage 10 change from a fast speed to a slow speed for the duration of its travel so that it does not override the programmed end point of movement. A selective output circuit in accordance with the present invention, designated generally by the numeral 18, is utilized to effect the slow speed portion of the carriage travel by acuating a "slow speed" relay 19 for the motor 16 when the counter 11 registers a number corresponding to that manually set in the selective output circuit 18 for such initiation.

In some instances, the original number preset in the counter 11 by the tape reader 13 is less than the "slow" number manually set in the selective output circuit 18, representing a relatively short distance Z away from the final position. When a number is actually preset, it then follows that the work carriage 10 must immediately commence its travel at the slow speed upon receipt of the "start" command. This necessitates that the selective output circuit 18 be sensitive and respond to a range of counts from the number manually set in the circuit 18 down through zero. Prior known glow tube counter circuits do not satisfy this requirement for they furnish outputs which results from a single count as set up by manual rotary switches. It is for this reason that the present invention is utilized in conjunction with such apparatus.

The specific details of the selective output circuit 18 in combination with the glow tube counter 11 are shown in FIG. 2. The counter 11 is composed of a units decade glow tube 21, a tens decade glow tube 22, a hundreds decade glow tube 23, and a thousands decade glow tube 24, each having an anode 25 and ten cathodes 26—26 numbered from 9 down through 0 as viewed from left to right. The specific manner in which the counter 11 performs its function of counting down from a number preset thereon is described in detail in a copending patent application of Harry R. Shillington, Serial No. 178,153, filed March 7, 1962, which is assigned to the assignee of the present application.

Briefly, the count registered by the counter 11 decreases by one unit in response to each input pulse received from the photocell transducer 14. This is accomplished by reversing the numbering order of the cathodes 26—26 of commercial glow tubes so that each tube proceeds to count down (instead of up) from the preset number by the stepping of the ionization discharge of the anode 25 from cathode to cathode, proceeding from left to right as viewed in FIG. 2. Thus, each input pulse received decreases the count on the units decade tube 21 by one until it reaches zero, at which time a transfer circuit 27 decreases the count on the tens decade tube 22 by one, and the units decade tube 21 registers a nine. When the tens decade tube 22 registers a nine, the count on the hundreds decade tube 23 decreases by one, and likewise the count on the thousands decade tube 24 decreases by one when the hundred decade 23 registers a nine.

A decade switch 28 is associated with each of the decade glow tubes and has numbered contacts 29—29 thereof arranged in an orderly semicircular array, each connected to a like-numbered cathode 26 of the associated tube. Each switch 28 has a selector arm 31 for making electrical connection with a selected reference contact 29 and a shunting segment 32 attached to but electrically insulated from the selector arm 31 for making electrical connection with all contacts designated by a number less than that of the reference contact. The electrically insulating, mechanical connection between each selector arm 31 and shunting bar 32 is indicated by the numeral 30. With this arrangement, as the ionization discharge attaches to any given cathode 26, that cathode begins to conduct a current and its potential increases to about twenty volts and this voltage rise and current are applied to the corresponding contact of the associated switch 28.

These selector switches 28—28 enable any number, corresponding to the distance Z to be traveled by the work carriage 10 at the slow speed, to be preset in the selective output circuit 18. If, for example, the "slow speed" distance corresponds to 0936 counts of the counter 11, the selector arm 31 of the units decade switch 28 is set at the contact designated by the numeral 6, that of the tens decade switch is set at the numeral 3, that of the hundreds decade switch is set at 9, and that of the thousands decade switch at 0, all as illustrated in FIG. 2. The shunting segment 32 of each switch 28 accordingly makes electrical connection with all contacts 29—29 of a number designation less than the reference contact.

Completing the selective output circuit 18, each selector switch 28 except the thousands decade switch has an AND circuit 33 associated therewith, and these AND circuits 33—33 are cascaded so as to analyze nonoverlapping ranges of counts of the counter 11, the sum of which ranges taken together cover the selected range of from 0 up through the "slow number" preset on the switches 28—28. Each AND circuit analyzes a nonoverlapping range of counts by having an input connected to the shunting segment 32 of the associated switch and an input connected to the selector arm 31 of each higher order decade switch 28. Thus, when an ionization discharge attaches simultaneously to (I) each cathode 26 connected through the selector arms 31—31 of all higher order decade switches 28—28 and (II) to one of the cathodes 26—26 connected through the shunting segment 32 of the associated decade switch 28 of any one AND circuit 33, the ionization discharges will give rise to an output from that AND circuit.

The AND circuit 33A associated with the hundreds decade switch 28, being the highest order decade switch with an associated AND circuit 33, has one input connected to the selector arm 31 of the thousands decade switch 28 and another connected to the shunting segment 32 of the hundreds decade switch so that it provides on output for all numbers registered by the counter 11 between 0000 and 0899. The AND circuit 33B associated with the tens decade switch 28 is connected to the selector arms 31—31 of the thousands and hundreds decade switches 28—28, and the shunting segment 32 of the tens decade switch so that it provides an output for all numbers registered by the counter from 0900 to 0929. Finally, the AND circuit 33C associated with the units decade switch 28 is connected to the selector arms 31—31 of the thousands, hundreds and tens decade switches, and both the shunting segment 32 and the selector arm 31 of the units decade switch in series so that it provides an output for all numbers from 0930 to 0936. Thus, each AND circuit 33 provides an output for nonoverlapping ranges, which ranges taken together encompass the selected range of from 0000 up through the "slow number" 0936 preset on the switches 28—28.

In general, the selector switch 28 for the thousands decade tube 24 is required to analyze numbers in excess of 1000. In that situation, the AND circuits 33—33 would be connected to the selector arm 31 of the thousands decade switch 28 as disclosed hereinabove to provide an overall range of "slow" number adjustment consonant with the range of the counter 11. In such a case, the shunting segment 32 of the thousands decade switch 28 is coupled directly to the "slow speed" relay 19 as by the conductor 35 and provides an output thereto for all numbers up to but not including the thousands digit preset on that switch. However, such a switch need not be included in a specific application where only numbers less than 1000 are desired to be preset for the "slow speed" command. In that case, the AND circuits 33—33 would be connected directly to the zero cathode of the thousands decade tube 24.

In addition, rather than connecting the selector arm 31 and the shunting segment 32 of the units decade switch 28 in series to provide an input for the associated AND circuit 33C, the selector arm 31 could be preset at the next digit higher than the selected one and the shunting segment only connected to that AND circuit. The cascaded AND circuits 33—33 would then provide an output signal for all numbers less than the preset number.

A preferred AND circuit 33 specifically designed for this application includes a diode 34 for each input leg of the AND circuit. All of the diodes 34—34 of each AND circuit normally conduct a current from a single positive source 36, each through an associated resistor 37 to a ground connection 38. An output conductor 39, connected to the positive terminal of each diode 34 and to the source 36 and having a very high resistive load (represented by numeral 39') relative to the resistors 37—37, conducts a significant output current from the source 36 only when the negative terminal of every diode 34 attains a potential greater than that of the source 36 connected to the positive terminal, causing each diode 34 to become nonconductive.

In utilizing AND circuits 33—33 of this design in combination with the selector switches 28—28, the selector arms 31 of all higher order decade switches 28—28 and the shunting segment 32 of the associated switch 28 are connected individually to the negative terminal of an associated diode 34. An ionization discharge attaching to a cathode 26 connected through a selector arm 31 or a shunting bar 32 to its associated diode 34, imparts a current from that cathode to the diode, which diode blocks conduction from the negative to the positive terminal thereof and forces conduction of the current through the associated resistor 37 to the ground connection 38. The conduction of current from the cathode 26 causes an increase in the potential thereof to approximately 20 volts which is applied to the negative terminal of the diode 34. If the source 36 has a potential of less than 20 volts, the diode will discontinue conducting current from the source because the potential of the negative terminal will be greater than that of the positive terminal. The current from a source 36 having a potential, for example, of 17 volts is therefore forced to be conducted totally through those parallel legs of the AND circuit 33 which remain conductive.

When the ionization discharge of each higher order decade tube attaches to the cathode 26 corresponding to the reference contact 29, and that of the associated decade tube attaches to one of the cathodes 26—26 corresponding to the contacts 29—29 connected by the shunting segment 32, for any one AND circuit 33, all of the diodes 34—34 therein become nonconductive, and only then will a significant current be conducted from the source 36 by the output conductor 39. In cascading the AND circuits 33—33 of this design to analyze nonoverlapping ranges of counts, the sum of which ranges is equivalent to the "slow number" preset on the switches 26—26, a diode 40 is interposed on each output conductor 39 and the conductor 35 to block the output current from being conducted through any conductor except a final output conductor 41. Thus, the selective output circuit 18 formed by cascading such AND circuits 33—33 is essentially an OR circuit. The output signal of the OR circuit formed in this manner may be used in any conventional manner to energize the "slow speed" relay 19; for example, by connecting the output conductor 41 to the grid of a thyratron tube (not shown) to cause it to fire and thereby energize the "slow speed" relay 19 at the proper time.

As a protective measure in utilizing AND circuits of this design in combination with the selector switches 28—28 and the glow tube counter 11, a diode 42 is disposed between each cathode 26 and its corresponding contact 29 permitting the conduction of current only from the cathode 26 to the contact 29. This protective measure is necessary to block the current from the sources 36—36 from being conducted through the associated switches 28—28 to the cathodes 26—26, and thus prevents any damage to the tubes that might accrue therefrom.

In utilizing such a selective output circuit in the application described hereinabove, the "slow" number 0936 is manually preset on the switches 28—28 prior to the commencement of the counting-down operation of the counter 11. If the counter 11 begins counting down from some number greater than 0936, the AND circuit 33C provides an output when the counter reaches the number 0936. If the counter 11 commences at some number less than 0936, the AND circuit 33A will provide an output for all numbers registered between 0000 and 0899, the AND circuit 33B will provide an output for all numbers between 0900 and 0929, and the AND circuit 33C for all numbers between 0930 and 0936. Thus, three AND circuits 33A, 33B, and 33C are cascaded to form an OR circuit for providing an output for either of three nonoverlapping ranges which, when combined, are equivalent to the number preset on the switches 28—28.

Various modifications of the specific embodiment disclosed hereinabove can be made. For example, instead of designing the selector switches so that all of the contacts at one side of a selector arm are connected by the shunting segment, the contacts in any predetermined position relative to the reference contact could be connected to the shunting segment to meet the requisites of the particular application. In addition, a single AND circuit could be connected (1) to the shunting segment of one switch and (2) to the selector arm of one other switch. Thus, any multiple intelligence signal applied to the switches, having a pattern relationship is established by the reference contact and the shunting segment of the switches connected to the AND circuit, will give rise to an output signal therefrom.

A further embodiment of the invention might include a separate series of AND circuits cascaded in the manner disclosed hereinabove for each digit of the highest order decade included within some variably selected range other than from zero up through the selected number. In such an application, the AND circuits of each series are cascaded so as to embrace nonoverlapping ranges of counts encompassing the portion of the composite selected range accommodated by the particular highest order digit associated with that series.

While one specific embodiment of the invention has been described in detail hereinabove, it will be obvious that various modifications may be made without departing from the spirit and scope of the invention.

What is claimed is:
1. A circuit for indicating when selected pattern relationships are present in a variable multiple intelligence signal, which comprises:
   a bank of multicontact switches, each having one specific contact to which the intelligence signal is applied at any one time in accordance with a pattern relationship to be analyzed;
   a movable selector arm associated with each switch and preset to make electrical connection with a selected reference contact of the associated switch;
   a shunting member associated with each switch and preset in accordance with the position of the selector arm to make electrical connection with any contacts of the associated switch which bear a predetermined position with respect to the reference contact, the selector arm and the shunting members thereby establishing the selected pattern relationships; and a coincidence circuit connected (1) to the shunting member of at least one switch in the bank and (2) to the selector arm of at least one other switch to provide an output signal when the pattern relationship of the intelligence signal applied is one of the selected pattern relationship established by the selector arms and shunting members of the switches connected to the coincidence circuit.

2. The circuit as recited in claim 1, wherein:

the multicontact switches comprising the bank are arranged such that each switch analyzes a particular portion of each pattern relationship of the multiple intelligence signal in accordance with a graduation of the degree of relative sensitivity of each portion;

the selector arm and the shunting member of each switch establishes the portion of the selected pattern relationships corresponding to that switch; and a coincidence circuit is associated with each switch except the one analyzing the least sensitive portion of each pattern and is connected to the shunting member of the associated switch and to the selector arm of each switch corresponding to a less sensitive portion of the pattern, each coincidence circuit providing an output signal when the pattern relationships of the intelligence signal applied is one of the selected pattern relationships established by the shunting member of the associated switch and by the selector arm of each switch corresponding to less sensitive portions of the pattern.

3. The circuit as recited in claim 1, wherein:

the multicontact switches comprising the bank are arranged such that each switch analyzes a particular portion of each pattern relationship of the multiple intelligence signal in accordance with a graduation of the relative degree of sensitivity of each portion and a graduation of the degree of sensitivity within each portion as established by the contacts of the corresponding switch;

the shunting member associated with each switch makes electrical connection with all contacts at one side of the reference contact to establish with the selector arm the selected sensitivities of the portion of the selected pattern relationships corresponding to that switch;

a coincidence circuit is associated with each switch except the one analyzing the last sensitive portion of each pattern and is connected to the shunting member of the associated switch and to the selector arm of each switch corresponding to a less sensitive portion of the pattern;

each coincidence circuit provides an output signal when the pattern relationships of the intelligence signal applied is one of the selected pattern relationships established by the shunting member of the associated switch and by the selector arm of each switch corresponding to less sensitive portions of the pattern; and an output conductor is connected to the shunting member of the switch corresponding to the least sensitive portion of each pattern whereby the output conductor in combination with the coincidence circuits provide an output signal for all pattern relationships of the intelligence signal having one of the selected sensitivities in each portion thereof established by the reference contact and all contacts connected at one side of the reference contact for the corresponding switch.

4. A circuit for providing an output signal representative of all counts of a multidecade counter included within a variable selected range, which comprises:

an AND circuit associated with each order decade except the highest to form a series of AND circuits, each AND circuit having (1) an input connected in common with all other AND circuits of the series to the output terminal of a selected digit in the highest order decade, (2) an input connected to the output terminal of all digits of the selected range in the associated decade of that AND circuit which can be encompassed by no other decade for the digit on the highest order decade common to all AND circuits of the series, and (3) an input connected to the output terminal of the digit necessary on each decade intermediate the highest and the associated order for completing the multidigit count that only the connected digit-indicating terminals of the associated decade of that AND circuit can encompass; and a separate series of AND circuits associated with each digit in the highest order decade included with the selected range, whereby (1) each AND circuit provides an output signal for a nonoverlapping range, (2) the ranges combine to encompass the portion of the composite selected range corresponding to the digit in the highest order decade associated with a single series, and (3) all series when taken together circumscribe the entire selected range and provide an output signal for any count therewithin.

5. The circuit as recited in claim 4, wherein:

a bank of multicontact switches is provided for each series of AND circuits, one switch of each bank being associated with each decade of the counter and each switch having ten individual contacts connected one to each individual digit-indicating output terminal of the associated decade of the counter;

a movable selector is provided for each switch and is preset to make electrical connection with a selected reference contact of that switch;

a shunting member is provided for each switch and is preset in accordance with the position of the selector arm to make electrical connection with any contacts of that switch which bear a predetermined position with respect to the reference contact; and the input connections of each AND circuit are completed through a switch corresponding to the associated decade of the counter, the selector arm and the shunting member establishing the digit-indicating output terminals of the associated decades to which electrical connection is made.

6. A circuit for indicating when the output signal of a multidecade counter circuit is below a preset multidigit number, which comprises:

a bank of multicontact switches associated one with each decade of the counter, each switch having ten individual contacts connected one to each individual digit-indicating output terminal of the associated decade of the counter;

a movable selector arm associated with each switch and preset to make electrical connection with a selected reference contact of the associated switch which corresponds to a selected digit in each decade;

a shunting member associated with each switch and electrically insulated from the selector arm, the shunting member being movable with the selector arm and being arranged to make electrical connection with all contacts of the associated switch designating digits lower than the reference contact;

a group of AND circuits associated one with each switch except the highest order decade switch, each AND circuit having one input connected to the shunting member of the associated switch and another input connected to the selector arm of all higher order decade switches; and an output conductor connected to the shunting member of the highest order decade switch, whereby the output conductor in combination with the AND circuits provide an output signal whenever the number is below the selected number.

7. The circuit as recited in claim 6, wherein each AND circuit comprises:

a plurality of diodes, one being provided for each respective selector arm and shunting member associated with the AND circuit and being connected thereto at its negative terminal;

a resistor associated with each diode for connecting the negative terminal thereof to a ground connection;

a source of positive potential connected to the positive terminal of all of the diodes so that current is normally conducted through the diodes and the associated resistors to the ground connections; and an output conductor, connected to the positive terminal of all of the diodes and having a very high resistive load relative to the resistors, through which a significant output current is conducted only when the negative terminal of each diode attains a potential greater than that of the source, causing the diodes to become nonconductive, by the conduction of a current from the counter through all of the reference contacts and one of the shunted contacts associated with the AND circuit and through the resistors to the ground connections.

No references cited.

UNITED STATES PATENT OFFICE
CERTIFICATE OF CORRECTION

Patent No. 3,163,747 December 29, 1964

George C. Veverka

It is hereby certified that error appears in the above numbered patent requiring correction and that the said Letters Patent should read as corrected below.

Column 2, line 60, for "an" read -- in --; column 3, lines 51 and 52, for "copending patent application of" read -- now abandoned patent application of the same assignee, by --; lines 53 and 54, strike out ", which is assigned to the assignee of the present application"; line 71, for "hundred" read -- hundreds --; column 4, line 51, for "on" read -- an --; column 7, line 48, for "last" read -- least --.

Signed and sealed this 29th day of June 1965.

(SEAL)
Attest:

ERNEST W. SWIDER
Attesting Officer

EDWARD J. BRENNER
Commissioner of Patents